US010850723B2

(12) United States Patent
Dockter et al.

(10) Patent No.: US 10,850,723 B2
(45) Date of Patent: Dec. 1, 2020

(54) SELF-PROPELLED VEHICLES HAVING A STEERING POSITION SENSOR

(71) Applicant: Vermeer Manufacturing Company, Pella, IA (US)

(72) Inventors: Nathan D. Dockter, Pella, IA (US); Kent M. Recker, Pella, IA (US); Kent L. Thompson, Otley, IA (US); Curt T. Graham, Lynnville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 268 days.

(21) Appl. No.: 16/056,712

(22) Filed: Aug. 7, 2018

(65) Prior Publication Data

US 2019/0047541 A1      Feb. 14, 2019

Related U.S. Application Data

(60) Provisional application No. 62/544,132, filed on Aug. 11, 2017.

(51) Int. Cl.
*B60W 10/20*     (2006.01)
*A01B 69/04*     (2006.01)
(Continued)

(52) U.S. Cl.
CPC ........... *B60W 10/20* (2013.01); *A01B 69/008* (2013.01); *B60K 7/0007* (2013.01); *B60W 10/08* (2013.01);
(Continued)

(58) Field of Classification Search
CPC ...... B62D 1/10; B62D 11/006; B62D 13/006; B62D 17/00; B62D 11/04; B62D 15/02;
(Continued)

(56) References Cited

U.S. PATENT DOCUMENTS 3,075,233 A    1/1963  Lorenz
4,090,581 A *  5/1978  Miner ..................... B62D 5/06
                                                 180/403
(Continued)

FOREIGN PATENT DOCUMENTS

EP    2927096 A1    10/2015
FR    2943608 B1    8/2012
WO    9609950 A1    4/1996

OTHER PUBLICATIONS

Hydraulics & Pneumatics, "Taking a Position on Hydraulic Cylinder Sensors", 7 pgs., retrieved from http://www.hydraulicspneumatics.com/cylinders-actuators/taking-position-hydraulic-cyliners.com/, Jul. 9, 2015.

(Continued)

*Primary Examiner* — Mussa A Shaawat
(74) *Attorney, Agent, or Firm* — Armstrong Teasdale LLP

(57) ABSTRACT

Self-propelled vehicles that include swiveling caster wheels and independent drive wheels are disclosed. The self-propelled vehicles are selectively steered in a caster wheel steering mode or a drive wheel steering mode. The vehicle includes a steering position sensor to measure the position of the steering system. A control unit varies the rotational speed of first and second drive wheels based at least in part of the signal from the steering position sensor.

21 Claims, 14 Drawing Sheets

(51) Int. Cl.
*B60K 7/00* (2006.01)
*B60W 10/08* (2006.01)
*B62D 11/04* (2006.01)
*B62D 15/02* (2006.01)
*B62D 5/10* (2006.01)
*B62D 7/20* (2006.01)
*B62D 11/00* (2006.01)
*B62D 11/24* (2006.01)
*B62D 9/00* (2006.01)
*G05D 1/02* (2020.01)
*B62D 5/06* (2006.01)
*B62D 5/22* (2006.01)

(52) U.S. Cl.
CPC ............... *B62D 5/10* (2013.01); *B62D 7/20* (2013.01); *B62D 9/00* (2013.01); *B62D 11/003* (2013.01); *B62D 11/04* (2013.01); *B62D 11/24* (2013.01); *B62D 15/02* (2013.01); *B62D 15/0225* (2013.01); *G05D 1/021* (2013.01); *B60W 2300/15* (2013.01); *B60W 2300/158* (2013.01); *B60W 2710/08* (2013.01); *B60W 2710/207* (2013.01); *B62D 5/06* (2013.01); *B62D 5/22* (2013.01); *G05D 2201/0201* (2013.01)

(58) Field of Classification Search
CPC .......... B62D 5/10; B62D 5/20; B60W 10/20; B60W 2300/15; B60W 2300/152; B60K 7/0007
See application file for complete search history.

(56) References Cited

U.S. PATENT DOCUMENTS

| | | | |
|---|---|---|---|
| 4,320,810 A | 3/1982 | Hillmann et al. | |
| 4,823,899 A | 4/1989 | Shimon | |
| 4,998,596 A * | 3/1991 | Miksitz | B60G 21/007 180/213 |
| 6,960,973 B2 | 11/2005 | Mattson et al. | |
| 7,316,288 B1 | 1/2008 | Bennett et al. | |
| 7,478,689 B1 * | 1/2009 | Sugden | A01D 34/67 180/19.3 |
| 8,186,697 B2 | 5/2012 | Stephenson | |
| 8,893,831 B2 | 11/2014 | Otto | |
| 2002/0014060 A1 | 2/2002 | Dillon et al. | |
| 2005/0126146 A1 * | 6/2005 | Velke | A01D 34/82 56/16.7 |
| 2008/0184687 A1 | 8/2008 | Scherbring et al. | |
| 2010/0003872 A1 * | 1/2010 | Jessen | B60F 3/0007 440/12.5 |
| 2012/0072076 A1 * | 3/2012 | Gustavsson | B60K 6/52 701/41 |
| 2013/0154219 A1 * | 6/2013 | Stanley | B62D 7/08 280/86.751 |
| 2013/0154222 A1 * | 6/2013 | Brendon | B60B 33/025 280/93.502 |
| 2014/0262559 A1 * | 9/2014 | DeChristopher | B60B 33/0071 180/6.2 |
| 2015/0223386 A1 | 8/2015 | Nafziger et al. | |
| 2016/0037707 A1 | 2/2016 | Bebernes et al. | |
| 2018/0087242 A1 * | 3/2018 | Mitchell | B62D 6/04 |
| 2019/0270356 A1 * | 9/2019 | Swank, II | B62D 9/00 |
| 2019/0359025 A1 * | 11/2019 | Wager | B60G 21/06 |
| 2020/0008990 A1 * | 1/2020 | Harrison | B62K 13/06 |

OTHER PUBLICATIONS

Control Products, Inc., "Hydraulic Cylinder Position Sensor", 5 pgs., retrieved from https://www.cpi-nj.com/hydraulic-cylinder-position-sensors, 2015.

Farmers Weekly, "Farmer Converts Massey Ferguson Tractor to Three-Wheeler", 3 pgs., retrieved from http://www.fwi.co.uk/machinery/farmer-converts-massey-ferguson-tractor-to-three-wheeler.htm, May 20, 2008.

* cited by examiner

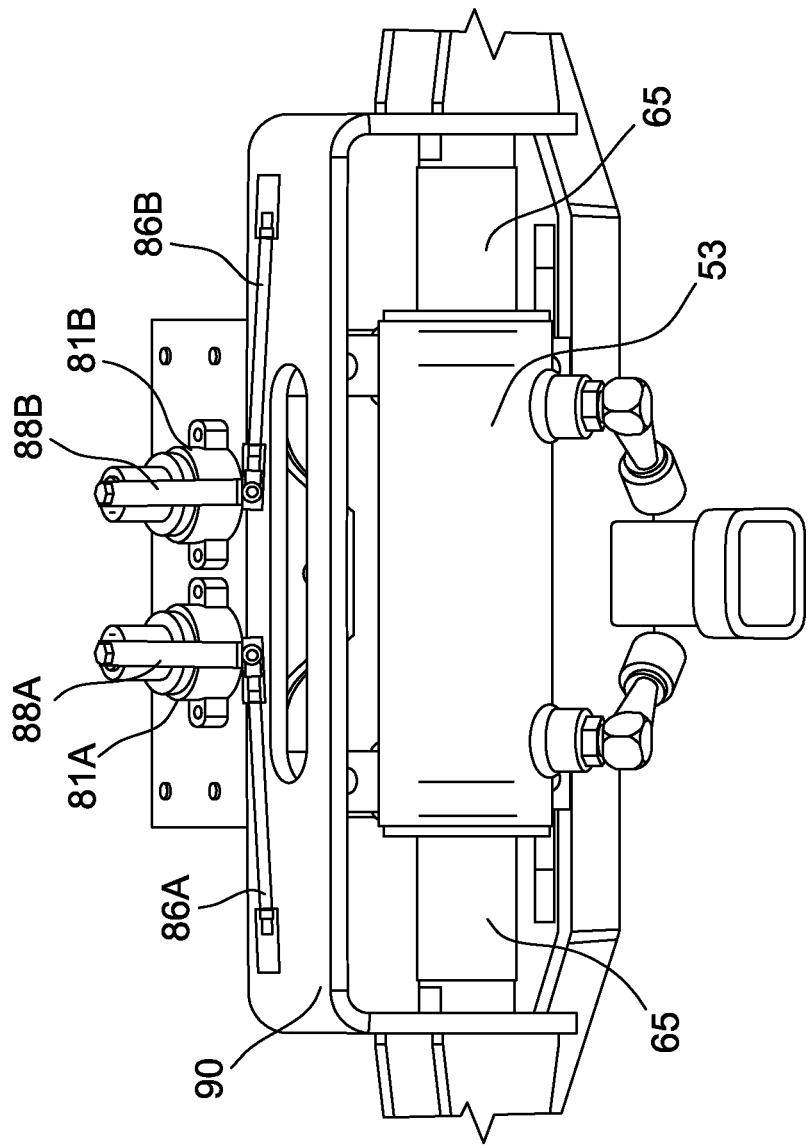

SELF-PROPELLED VEHICLES HAVING A STEERING POSITION SENSOR

CROSS-REFERENCE TO RELATED APPLICATION

This application claims the benefit of U.S. Provisional Patent Application No. 62/544,132, filed Aug. 11, 2017, which is incorporated herein by reference it its entirety.

FIELD OF THE DISCLOSURE

The field of the disclosure relates to self-propelled vehicles and, in particular, self-propelled vehicles that include independent drive wheels and a steering position sensor to measure the position of the steering system.

BACKGROUND

Self-propelled implements such as agricultural implements are often used at various sites that are separated by large distances. The implement is transported on a trailer or is towed or propelled over the road system. Implements which include a dedicated propulsion system (e.g., sprayers, windrows or the like) may be difficult to steer at high speed as the implements are designed for field steering during their agricultural operation.

A need exists for new vehicles that are self-propelled and that reliably measure the position of the steering system for use in one or more different modes of steering.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a self-propelled vehicle. The vehicle includes a chassis and first and second drive wheels connected to the chassis. First and second drive systems are connected to the first and second drive wheels for independently controlling a rotational drive speed of each of the first and second drive wheels. The vehicle includes a steering system for steering the vehicle. The steering system includes a steering device and a steering actuator connected to the steering device. The steering system includes a steering position sensor that produces a signal based on the position of the steering actuator. A control unit adjusts the rotational drive speed of the first drive wheel and the rotational drive speed of the second drive wheel based at least in part on the signal produced by the steering position sensor. A difference in rotational drive speed between the first and second drive wheels steers the vehicle.

Another aspect of the present disclosure is directed to a steering system for steering a vehicle. The steering system includes a steering device for controlling the position of the steering system and a hydraulic cylinder connected to the steering device. First and second tie rods are connected to the hydraulic cylinder. A steering position sensor produces a signal based at least in part on the position of the hydraulic cylinder and/or tie rods.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 14 is a detailed perspective view of a steering position sensor.

Corresponding reference characters indicate corresponding parts throughout the drawings.

DETAILED DESCRIPTION

Figure 1:
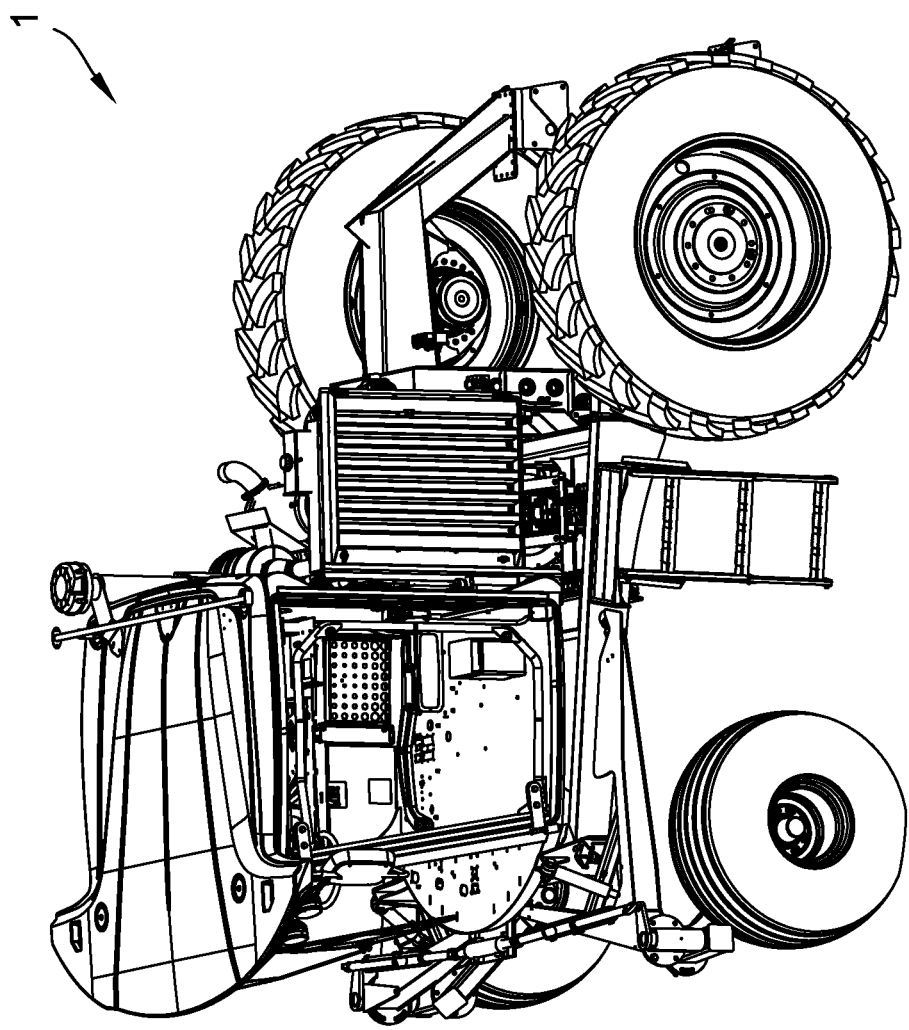
FIG. 1 is a perspective view of a self-propelled vehicle.

FIG. 1 shows an embodiment of a self-propelled vehicle 1. In the embodiment illustrated in FIG. 2, the vehicle includes a baling device 5 for forming a bale of crop or forage material. In other embodiments, the self-propelled vehicle 1 may be an agricultural vehicle such as a mower and mower conditioner, merger, baler, rake, tedder, bale processor, bale mover, sprayer, broadcast spreader, fruit or nut harvester, or the like. In other embodiments, the vehicle 1 is configured for non-agricultural use (e.g., construction, shipping or the like). Reference herein to the baling device 5 should not be considered limiting and any suitable device may be substituted for the baling system unless stated differently (e.g., cutting or mower head, sickle bar, spray tank and/or booms, harvesting devices (e.g., grape or nut harvesting devices), broadcast spreader or the like). In some embodiments, the vehicle 1 is adapted to carry a load (e.g., bale, herbicide, fertilizer, or harvested crop such as nuts or fruits).

The device 5 (e.g., baling device 5) is supported by a chassis 9. In embodiments in which the device is a baler, the vehicle also includes a pick-up device 11 (FIG. 3) that rotates to feed crop or forage material to the baling device 5. The vehicle 1 is controlled from an operator station 13 and is powered by an engine 101. Each of the operator station 13, engine 101 and device 5 are supported by the chassis 9 (i.e., the engine 101 is not part of a towed vehicle such as a tractor that releasably connects to the device by a hitch assembly attached to an implement tongue).

The vehicle 1 includes first and second caster wheels 27 and first and second drive wheels 17. The term "caster wheel" includes a wheel mounted to a frame or chassis at a generally vertically oriented caster pivot so that the caster wheel is able to swivel about the caster pivot.

In the illustrated embodiment, the caster wheels 27 are the front wheels and the drive wheels 17 are rear wheels. In other embodiments, the caster wheels 27 are rear wheels and the drive wheels 17 are front wheels.

Each of the wheels 17, 27 is connected to the chassis 9 and can be rotated around a rotational axis $R_{17}$, $R_{27}$. In the illustrated embodiment, the drive wheels 17 have a common rotational axis $R_{17}$ and the caster wheels 27 have a common rotational axis $R_{27}$. In other embodiments, the drive wheels 17 are offset from each other and have different axes of rotation and/or the caster wheels 27 are offset from each other and have different axes of rotation. In this embodiment, the vehicle 1 includes four wheels, though in other embodiments, the vehicle may include any number of drive and caster wheels.

As shown in FIGS. 1-4, the drive wheels 17 have a diameter that is larger than a diameter of the caster wheels 27. In some embodiments, the ratio of the diameter of the drive wheels 17 to the diameter of the caster wheels 27 is at least about 1.25:1 or at least about 1.5:1 or even at least about 3:1.

Figure 2:
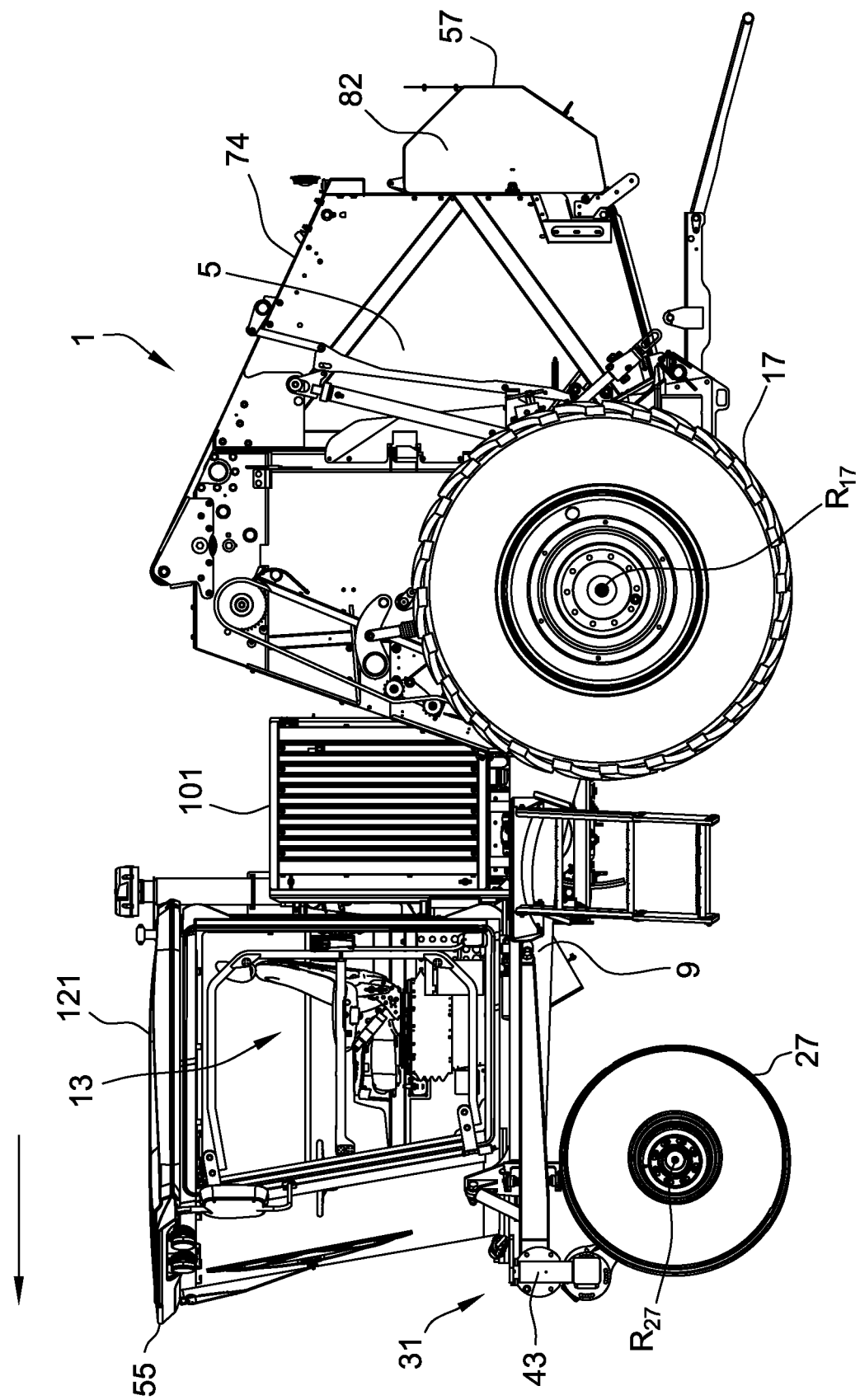
FIG. 2 is a side view of a self-propelled vehicle shown as a baling vehicle.

The first and second caster wheels 27 are pivotally connected to the chassis 9 (FIG. 2). The caster wheels 27 and/or drive wheels 17 may be spaced to allow the chassis 9 to support a device (e.g., agricultural implement) such as a round baler 5 and pick-up device 11 as shown in the illustrated embodiment. In some embodiments, the vehicle 1 includes a single front caster wheel 27.

Figure 6:
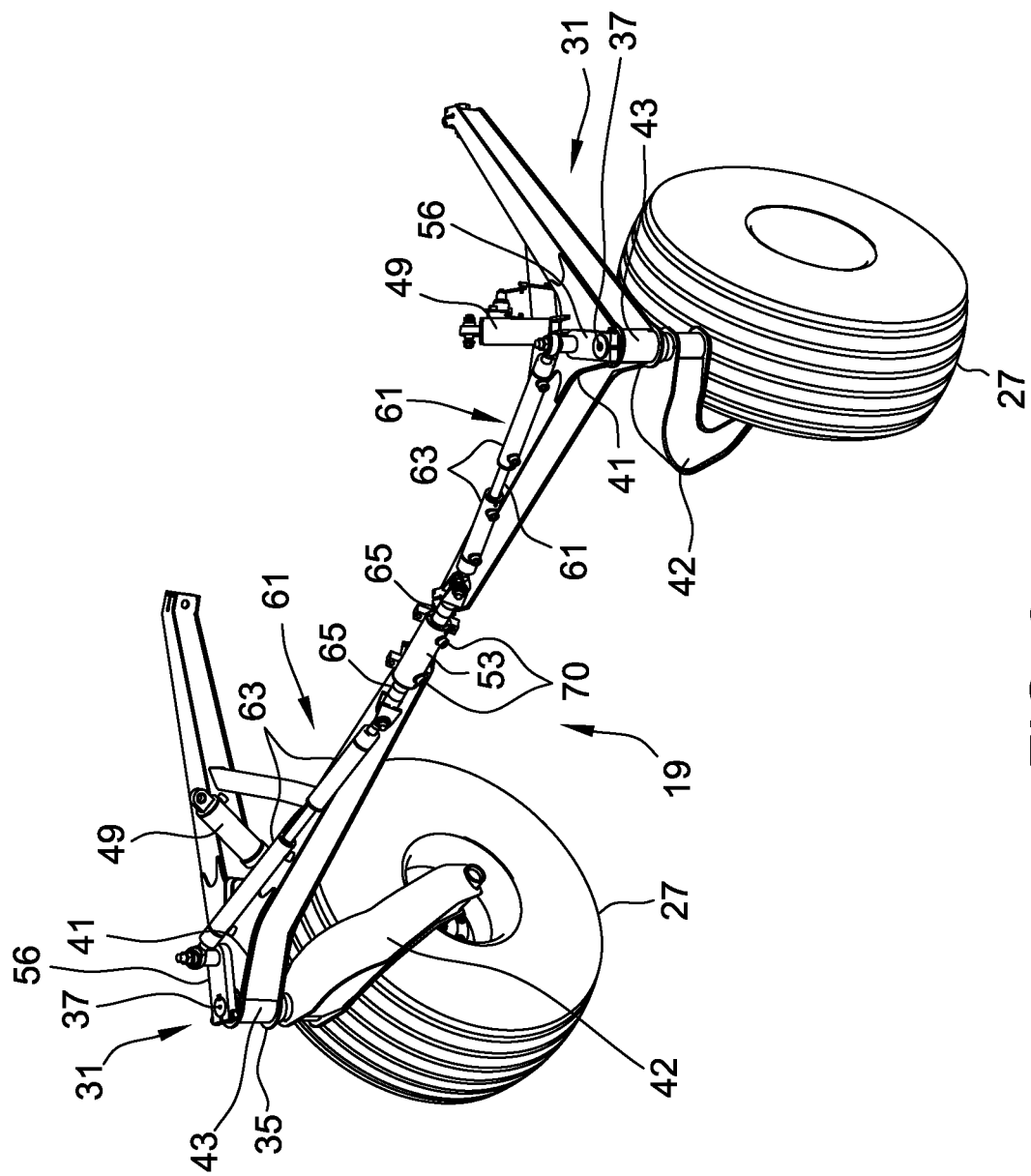
FIG. 6 is a perspective view of a portion of the self-propelled vehicle including caster assemblies.

With reference to FIG. 6, in the illustrated embodiment the caster wheels 27 are independently suspended from the chassis 9 (FIG. 2) to absorb forces transmitted during travel over uneven terrain. In other embodiments, the vehicle 1 does not include a caster wheel suspension system.

The drive wheels 17 are fixed to the chassis 9 such that the wheels 17 maintain parallel alignment with a longitudinal axis A (FIG. 4) of the vehicle 1 (i.e., do not pivot with respect to the chassis). The longitudinal axis A of the vehicle extends from a front 55 to a rear 57 of the vehicle 1. As referenced herein, the "front" of the vehicle refers to a leading portion or end of the vehicle relative to the longitudinal axis during conventional operation as indicated by the arrow in FIG. 2. The "rear" refers to the trailing portion or end relative to the longitudinal axis during conventional operation. Similarly, the terms "front wheels" and "rear wheels" refer to the relative position of the wheels relative to the direction of travel of the vehicle during conventional operation. The vehicle also includes a lateral axis B (FIG. 4) that extends from a first side 58 (FIG. 3) to a second side 59 of the vehicle 1 and that is transverse to the longitudinal axis A.

In a drive wheel steering mode, the vehicle 1 is steered by creating a differential speed between the first and second rear drive wheels 17 (i.e., by creating a difference between the first drive wheel rotational speed and the second drive wheel rotational speed). In this mode, each drive wheel 17 is capable of being driven forward or in reverse independent of the speed and direction of the other wheel (i.e., the drive wheels may be operated in counter-rotation). As an operator controls a steering device (e.g., steering wheel), the rear drive wheels 17 rotate at different speeds to steer the vehicle 1 through an arc or deviation in the travel pathway. In the drive wheel steering mode, a control system (e.g., control unit 80 in FIG. 5) utilizes an algorithm or look-up table to determine or calculate a speed differential at which the drive wheels operate based at least in part on the position of the steering actuator.

The speed and direction of travel (forward or rearward) may be controlled by a separate operator control. In the drive wheel steering mode, the vehicle 1 may be turned within its own footprint. In this mode, the caster wheels 27 self-align with the direction in which the drive wheels propel the vehicle, i.e., the caster wheels 27 follow the direction of travel of the rear drive wheels 17.

In a caster wheel steering mode, the swivel position of the caster wheels 27 may be controlled to steer the vehicle. As used herein, the "swivel position" of the caster wheels generally refers to the angular position of the caster wheels relative to the longitudinal axis A (FIG. 4) of the vehicle. The caster wheels 27 are connected to a steering system 19 (FIGS. 5 and 6) which controls the swivel position of the caster wheels 27. As such, the vehicle 1 may travel at high speeds and the caster wheels 27 may be steered to prevent wobbling or other uncontrolled movement.

In the caster wheel steering mode, the drive wheels 17 rotate at different speeds as the vehicle 1 is steered through a curved path. In this mode, the drive wheels 17 rotate in the same direction with the speed and direction of rotation being controlled by an operator. The relative speed of the drive wheels 17 is compensated by engaging a differential system 8 (FIG. 5) that allows the relative rates of rotation of the drive wheels to match the arc defined by the swivel position of the caster wheels 27.

Figure 5:
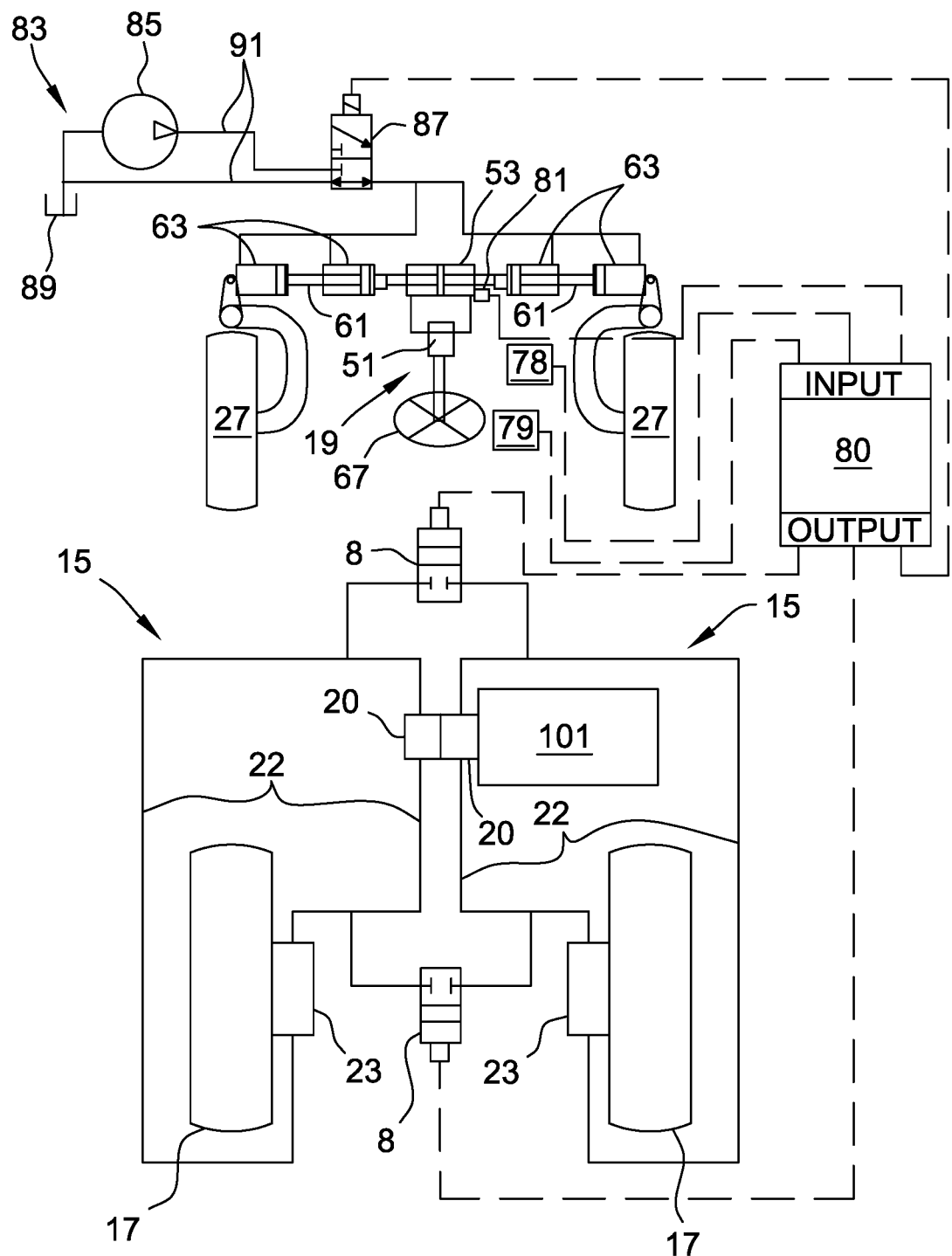
FIG. 5 is a schematic view of the self-propelled vehicle showing the drive systems.

With reference to FIG. 5, the first and second drive wheels 17 are each driven and controlled by separate drive systems 15. Each drive system 15 has a drive motor 23 for rotating the drive wheel 17 forward or backward. The drive motors 23 may be hydraulic motors that are driven by a pump 20 that is powered by the engine 101. Each drive wheel 17 may be controlled by a separate circuit (i.e., separate hydraulic pumps 20 with fluid lines 22 connected to the drive wheel motors 23). The first and second pumps 20 may be hydrostatic, variable displacement pumps. In some embodiments, fixed displacement or variable displacement motor(s) may be used.

The wheels 17 are powered and rotated independently by the drive systems 15. Accordingly, the wheels 17 can be rotated at different speeds by driving the motors at different speeds. In the drive wheel steering mode, the wheels 17 are driven at different speeds by the drive system 15. In this mode, the motors 23 receive different amounts of fluid from the respective pumps 20 to differentiate the speed of the wheels 17. Separate fluid lines 22 extend between each pump 20 and drive motor 23 to independently rotate the wheels 17. The direction of fluid flow may be forward or reverse to independently rotate the wheels forward or reverse to propel the vehicle forward, reverse, through an arc (e.g., as during steering) or about a vertical axis midway between the drive wheels 17 (e.g., as during zero turn steering).

In a caster wheel steering mode, the pumps 20 are powered equally but the wheels 17 are able to rotate at different speeds due to a differential system (shown as differential valves 8) that transfers fluid between the drive systems. The valves 8 may be components of a single valve block or may be separate valves. In some embodiments, each differential valve 8 is activated to an open position in the caster wheel steering mode to allow fluid to transfer between the drive systems 15 to allow the drive wheels 17 to rotate at different speeds to follow the arc defined by the caster wheels 27 during steering. The valves 8 may operate to be fully opened or closed.

Generally, any hydraulic valve 8 that allows the valve to be controllably opened and closed may be used. The valve 8 may be a directional control valve, solenoid on/off valve, electro-proportional valve, or the like and/or may be electrically (e.g., solenoid), hydraulically or manually actuated. The vehicle 1 may generally include any hydraulic differential system that enables the vehicle to operate as described unless stated differently.

As shown in FIG. 6, the caster wheels 27 may be part of first and second swivel caster assemblies 31. The first and second caster assemblies 31 are connected to the chassis 9 (FIG. 2) and the swivel position of the caster wheels 27 is selectively controlled by the steering system as determined by the mode of operation of the vehicle (i.e., caster wheel steering mode or drive wheel steering mode). Generally the first and second caster assemblies 31 and subframes 41 described below are symmetric and description herein of an assembly or subframe also applies to the second assembly or subframe (e.g., description of a hub of the assembly indicates that the first assembly has a first hub and that the second assembly has a second hub). Each assembly 31 includes a hub 35 and a caster shaft 37 that rotates within the hub 35. The swivel caster assemblies 31 may include bushings or bearings within the hub 35 that allow for rotation of the shaft 37 within the hub 35. Each caster shaft 37 is connected to a leg assembly 42 that connects to the caster wheel axle. In the illustrated embodiment, the leg assembly 42 includes a single leg that attaches to an inner side of the wheel axle. In other embodiments, the leg assembly includes two legs that connect to the axle of the caster wheel on each side of the wheel (as with a caster fork).

Figure 7:
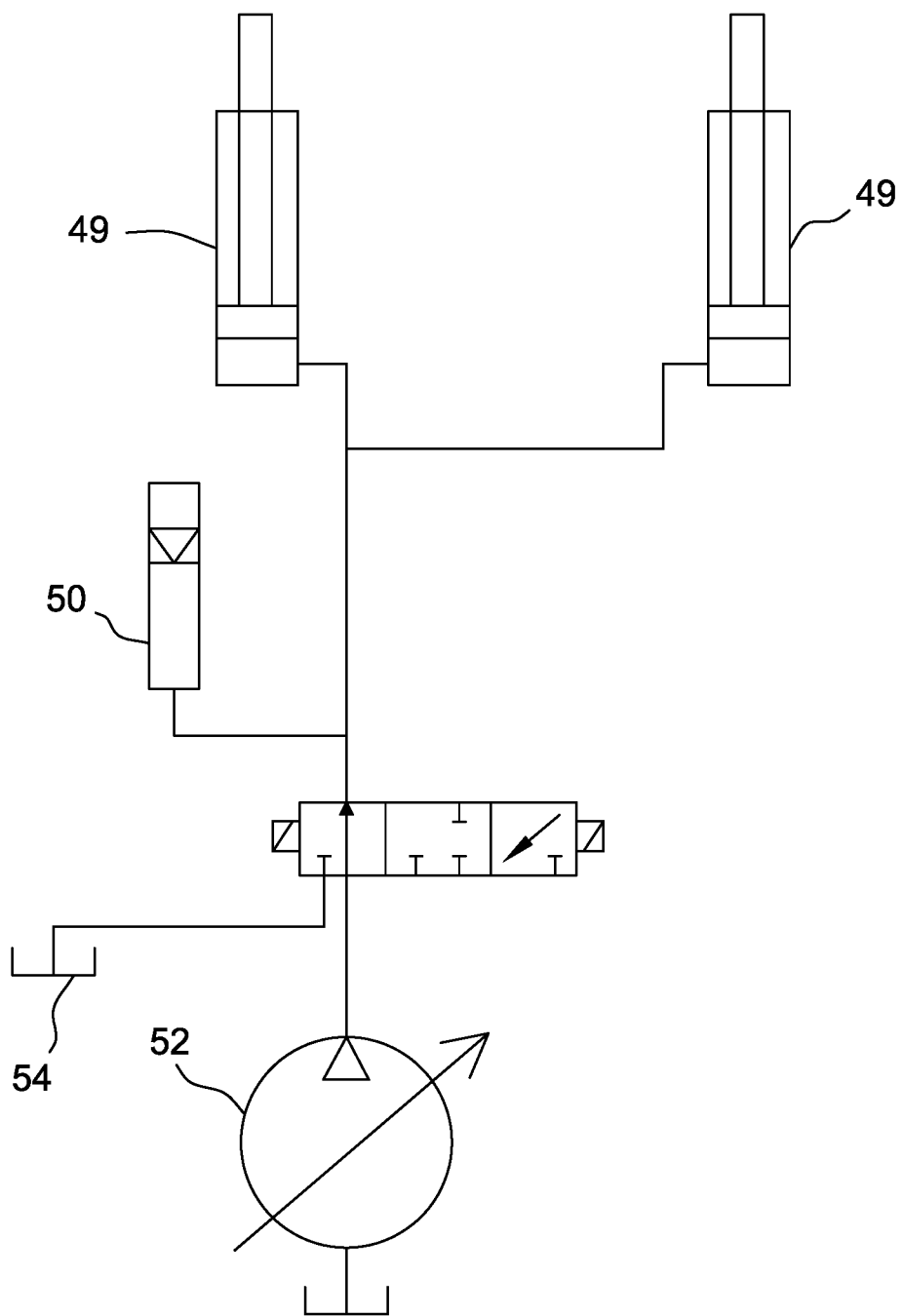
FIG. 7 a schematic view of the vehicle showing a hydraulic suspension system.

The first and second caster wheels 27 of the caster assemblies 31 are each connected to the subframe 41 by a swivel joint 43 formed by the hub 35 and shaft 37. The subframes 41 are suspended from the chassis 9 by a mechanism having a suspension element 49, shown as a hydraulic cylinder in the illustrated embodiment. With reference to FIG. 7, each cylinder 49 may be connected to an accumulator 50 in the suspension system with the hydraulic fluid being provided from a source 54 by a hydraulic pump 52. Other suspension elements such as shock absorbers may be used in other embodiments.

Figure 8:
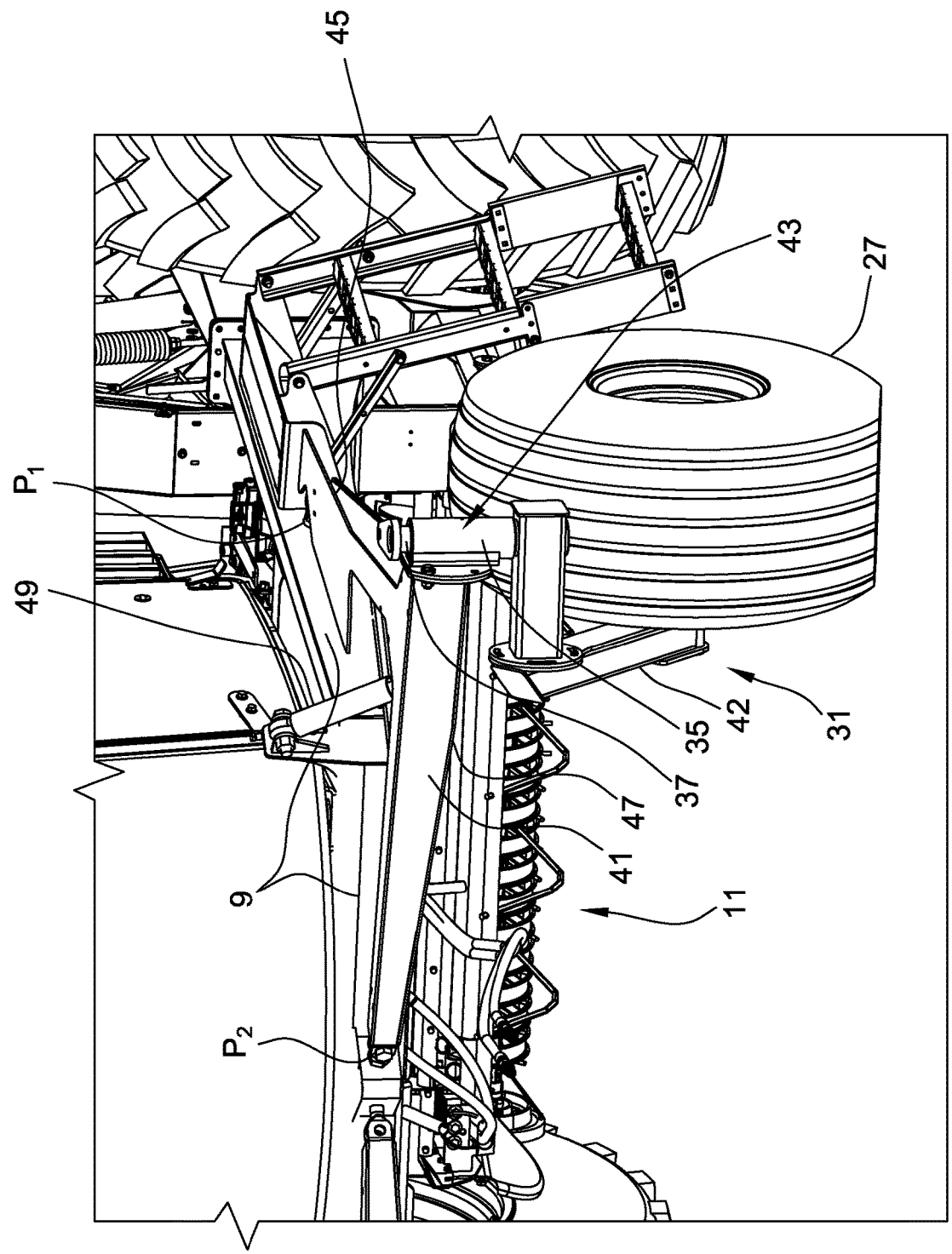
FIG. 8 is a perspective view of a caster assembly of the self-propelled vehicle.

With reference to FIG. 8, each subframe 41 is also pivotally attached to the chassis 9 at an outer pivot point $P_1$ and an inner pivot point $P_2$. In this arrangement, the chassis 9 is supported by the subframes 41 and the chassis 9 and components carried by the chassis 9 (e.g., operator station and cab) may move up and down relative to the subframes 41 as the vehicle 1 travels over uneven terrain.

As shown in FIG. 8, the subframe 41 has two legs 45, 47 that extend from the chassis 9. The swivel joint 43 is at the point at which the legs 45, 47 meet and is forward of the inner and outer pivot points $P_1$, $P_2$ relative to a longitudinal axis A (FIG. 4) of the vehicle. The swivel joint 43 is also outward to both the inner and outer pivot points $P_1$, $P_2$ relative to the lateral axis B (FIG. 4) of the vehicle 1 (i.e., the outer pivot point $P_1$ of each subframe 41 is positioned between the inner pivot point $P_2$ and the point of attachment of the suspension element 49 relative to the lateral axis B).

In other embodiments, the subframe 41 may have a single leg or may include any other arrangement of components that allows the caster wheels 27 to be positioned below the chassis 9 to support the vehicle.

In the drive wheel steering mode, the caster wheels 27 are freely pivotable (i.e., are not steered or otherwise controlled). As a result, the caster assemblies 31 allow the first and second caster wheels 27 to self-align with the direction of travel of the vehicle while it is steered by the difference in the speed of rotation of the drive wheels 17. As shown in FIG. 2, each of the first and second caster wheels 27 is offset from the swivel joint 43. In other words, the axes of rotation $R_{27}$ of the first and second caster wheels 27 do not intersect axes of rotation of the swivel joints 43. The first and second caster wheels 27 pivot independently from each other in the drive wheel steering mode.

In the caster wheel steering mode, the caster wheels 27 are engaged by the steering system and used for steering. In the preferred embodiment, the differential valves 8 (FIG. 5) are opened (e.g., by energizing solenoids) with equal output from the drive wheel pumps 20 with the differential speeds of the drive wheels 17 being enabled by fluid flow through the differential valves 8. In an alternative embodiment (i.e., a hybrid steering mode), the differential valves 8 are opened and the output from the drive wheel pumps 20 is varied to the two drive wheels 17 based on the output of the control unit. In this hybrid mode, the swivel position of the caster wheels 27 is controlled and the relative speeds of the drive wheels 17 is also controlled (e.g., similar to the drive wheel steering mode). The control unit acts to approximately vary the speed of the drive wheels 17 in order to provide the curve that is consistent with the swivel position of the caster wheels 27. The differential valves 8 will allow slight variations in the differential speed of the drive wheels 17 that result from differing conditions that may affect the actual curve achieved by the vehicle 1.

With reference to FIGS. 5 and 6, the steering system 19 selectively engages a steering linkage to control the swivel position of the caster wheels 27 in the caster wheel steering mode. The steering system 19 may include a mechanical and/or electrical coupling mechanism to selectively engage the steering system with the caster wheels 27.

With reference to FIGS. 5 and 6, in the illustrated embodiment the steering system 19 includes an orbital valve 51, a steering actuator 53 (shown as a hydraulic cylinder) and first and second tie rods 61 with each tie rod being connected to an opposite side of the steering actuator 53. The orbital valve 51 regulates fluid flow to the steering actuator 53 based on input from a steering device such as a steering wheel 67. The steering system 19 may include a steering pump (not shown) to provide the fluid flow.

The steering device 67 may be any suitable operator control such as a steering wheel, wheel lever, digital inputs, joystick, dual sticks, and/or a headset.

In the illustrated embodiment, the steering actuator 53 is a double acting cylinder having a through rod 65 that extends from each side of the barrel which pushes/pulls the tie rods 61 to commonly align the caster wheels 27 during caster wheel steering. The steering cylinder 53 includes inlet and outlet ports 70. Fluid flows through the ports 70 in a first direction to cause the through rod 65 to move to cause both caster wheels 27 to be steered. Fluid is caused to flow in the opposite direction to actuate the through rod 65 in the opposite direction, and to cause the caster wheels 27 to be steered in the opposite direction.

Each tie rod 61 connects to a linkage 56 connected to the caster assembly shafts 37. Each tie rod 61 includes a disengagement cylinder 63 (e.g., a three-way cylinder) to enable selective steering of the caster wheels 27. In the caster wheel steering mode, the disengagement cylinders 63 are locked in an extended position such that actuation of the steering actuator 53 causes pivoting movement of the caster wheels 27 (i.e., the tie rods 61 are a fixed length). In the drive wheel steering mode, the disengagement cylinders 63 are allowed to float (i.e., fluid is allowed to freely flow with little or no pressure), thereby disengaging the movement of the steering actuator 53 from the caster wheels 27 (i.e., the tie rods 61 are variable in length). As such, actuation of the steering actuator 53 will not be translated through the disengagement cylinders 63 to the caster wheels 27 and the castor assemblies 31 will be allowed to freely pivot in the drive wheel steering mode.

The disengagement cylinders 63 are connected to a hydraulic system 83 (FIG. 5) that regulates the fluid flow to the cylinders 63. The hydraulic system 83 includes a pump 85, a valve 87, a hydraulic fluid tank 89, and fluid lines 91. In the caster wheel steering mode, the valve 87 allows oil into the cylinders to lock-out the disengagement cylinders 63 with pressure created by pump 85. In the drive-wheel steering mode, valve 87 is shifted to allow fluid to freely flow in and out of the disengagement cylinders 63 and back to the tank 89.

In the caster wheel steering mode, the steered caster wheel system includes mechanical connections from the steering device 67 to the caster wheels 27 for steering of the caster wheels 27 (i.e., includes only mechanical linkages and/or hydraulic components to translate movement of the steering device into caster wheel steering). In this mode, pivoting of the caster wheels 27 is not a response to a control unit signal.

In alternative embodiments, the vehicle 1 may include any steering system 19 that enables the vehicle to operate as described. For example, the steering system 19 may include any of the following components, without limitation: tie rods, rack and pinion mechanisms, orbital valves, cylinders, motors, and bell cranks. In some embodiments, the castor assemblies 31 are locked by manual and/or automatic mechanisms that prevent the castor assemblies from freely pivoting such as during the drive wheel steering mode.

The vehicle 1 includes a control system to control the drive wheels 17 and front caster wheels 27 based on inputs from an operator. The control system includes a control unit 80, speed and direction control device 78, a mode selector 79 and steering device which is shown as a steering wheel 67. The speed and direction control device 78, mode selector 79 and steering wheel 67 may be controlled from the operator station 13.

The control unit 80 includes a processor and a memory. The processor processes the signals received from various sensors, selectors and control devices of the system. The memory stores instructions that are executed by the processor.

Control unit 80 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable control unit 80, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Wash.). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

The mode selector 79 allows the operator to select a desired mode of operation (i.e., drive wheel steering mode or caster wheel steering mode). The control unit 80 receives the signal from the mode selector 79 and controls the mode of the steering system in response to the signal. The mode selector 79 may be, for example, part of a touch screen, a soft key, toggle switch, selection button or any other suitable interface for selecting the steering mode.

The speed and direction control device 78 is typically hand-operated and may be a sliding lever that that causes an increase in forward speed as the lever is slid forward of a neutral position and an increase in reverse direction as the lever is slid rearward of the neutral position. The speed and direction control device 78 produces a signal in response to its position and the signal is transmitted to the control unit 80. The control unit 80 produces an output signal transmitted to the hydraulic pumps 20 that drive the rear wheels 17. The speed may also be controlled by a throttle that controls the engine speed. The vehicle 1 may be stopped by moving the speed and direction control device 78 to a zero-speed setting and/or by operating foot brake levers.

In the illustrated embodiment, steering may be performed by a steering device shown as a steering wheel 67 which regulates the steering system. In the drive wheel steering mode, a steering position sensor 81 measures the position of the steering actuator 53 and sends signals to the control unit 80 which generates an output (e.g., by an algorithm or look-up table) to control the difference in the rotation speed of the drive wheels 17.

As example steering position sensor 81 is shown in FIG. 14. In the illustrated embodiment, the vehicle 1 includes two steering position sensors 81A, 81B for redundancy. In other embodiments, the vehicle 1 includes a single steering position sensor 81. Description herein to a single sensor 81 should be understood to apply to both sensors 81A, 81B unless stated otherwise. The steering position sensor 81 produces a signal based on the position of the steering actuator 53 (e.g., the position of the actuator itself rather than measuring the angular position of the caster wheels or of the steering device). The sensor 81 may be any sensor which correlates the position of the steering actuator 53. In the embodiment shown in FIG. 14, the sensor 81 is an angular potentiometer. In other embodiments, the sensor 81 may be an integral position sensor such as an integral position sensor within a hydraulic cylinder. The sensor 81 may operate by magnetostriction, by variable resistance (potentiometer-type) or by linear variable inductance.

Each sensor 81A, 81B is connected to a lateral linkage 86A, 86B. The linkages 86A, 86B are connected to a bracket 90 at their other end. The bracket 90 is connected to the through rod 65 of the actuator 53 and moves laterally with the through rod 65. Each lateral linkage 86A, 86B is connected to a sensor arm 88A, 88B which is mounted to the sensor 81A, 81B. As the through rod 65 moves laterally (either in drive wheel steering mode or caster wheel steering mode), the bracket 90 and lateral linkages 86A, 86B move with the through rod 65. Movement of the lateral linkage 86A, 86B causes the sensor arm 88A, 88B to rotate the sensors 81A, 81B causing them to produce a signal based on the position of the steering actuator 53.

The sensor 81 is operatively connected to the control unit 80 to send the signals generated by the sensor to the control unit 80. The control unit 80 produces a signal based at least in part on the position of the actuator 53 that is transmitted to the hydraulic pumps 20 to independently regulate the rotational speeds of the first and second drive wheels 17 (i.e., the rotation speed and direction of rotation of each drive wheel 17).

Figure 9:
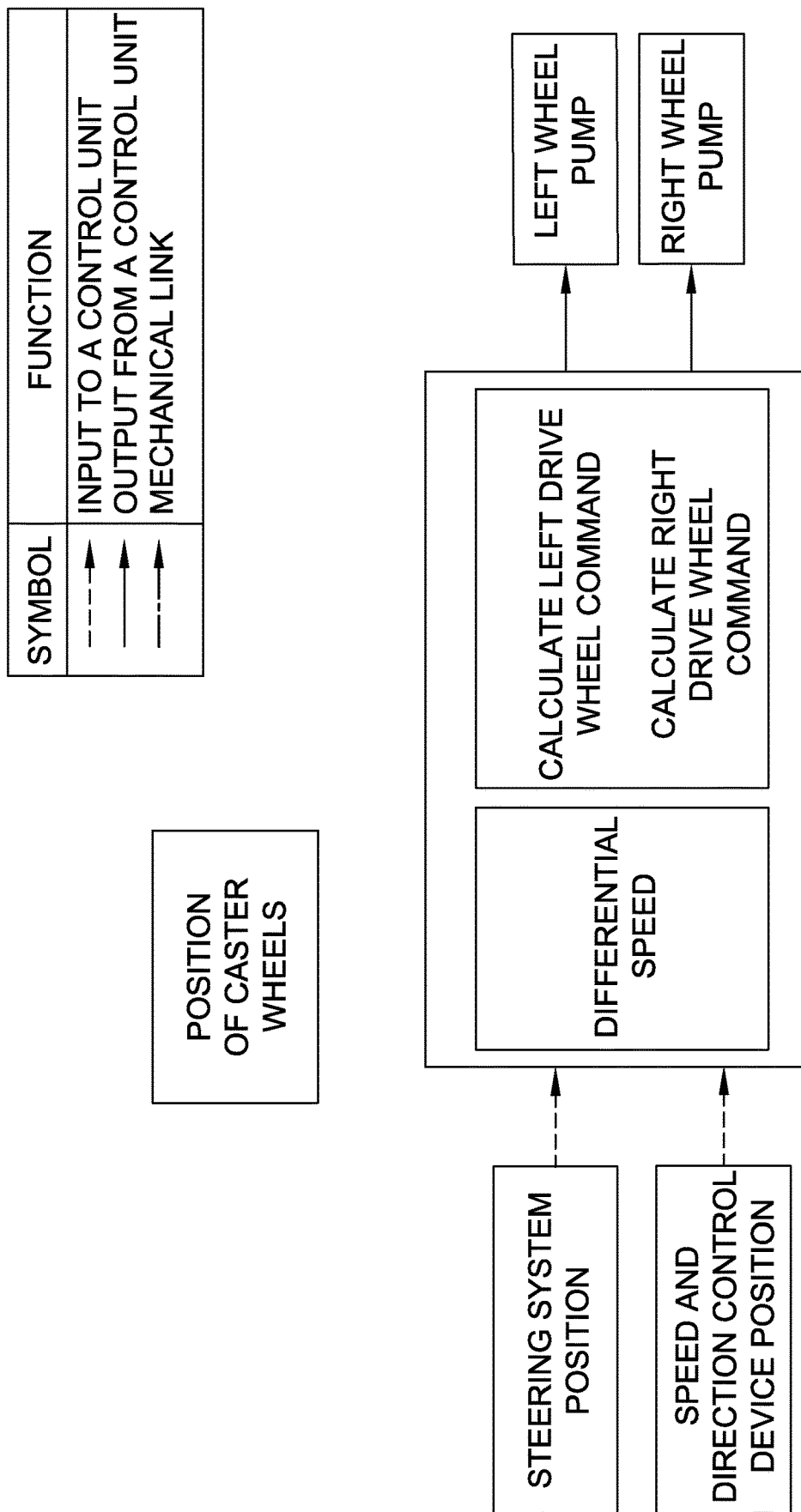
FIG. 9 is a flow diagram of a drive wheel steering mode of the self-propelled vehicle.
Figure 10:
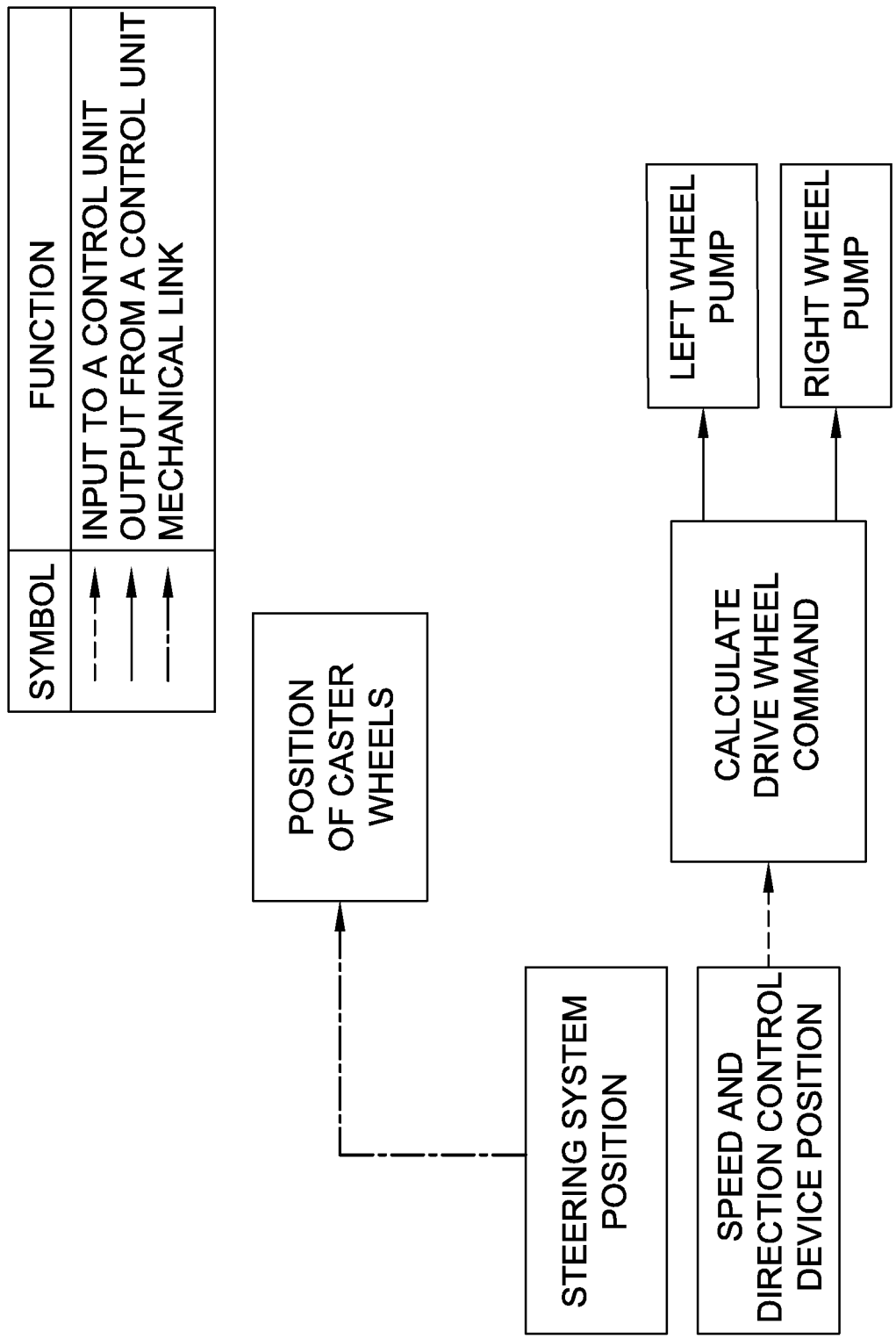
FIG. 10 is a flow diagram of a caster wheel steering mode of the self-propelled vehicle.

With reference to FIGS. 9 and 10, the vehicle 1 may be operated in either the drive wheel steering mode (e.g., field mode) in which the self-propelled vehicle is steered by the rear drive wheels or a caster wheel steering mode (e.g., transport mode) in which the caster wheels are used to steer the vehicle. In either of these modes the operator uses the steering device 67 to control the direction of travel.

The drive wheel steering mode is shown in FIG. 9. As shown by the absence of a connecting line, the orientation of the caster wheels is not controlled by a mechanical steering link or by output from the controller. The orientation of the caster wheels is independent from the steering system position and the position of the directional control device. The caster wheels follow the direction of travel of the vehicle as steered through rotation of the first and second drive wheels.

In the drive wheel steering mode, the steering system position, as measured by steering position sensor 81, sends a signal to a control unit. The "steering system position" of FIG. 9 refers to the position of the steering actuator 53 and/or various linkages that position the caster wheels 27 (e.g., linkages that move even when caster wheel steering is disengaged as in the drive wheel steering mode). The steering system position is measured by the steering position sensor 81 and not by a sensor that measures the position on the steering device 67. The steering actuator 53 does not control the position of the caster wheels in the drive wheel steering mode.

The steering position sensor 81 sends a signal to a control unit. A signal related to the position of the speed and direction control device is also sent to the control unit. The steering position signal and the speed and direction control device position signal are used to calculate a speed differential (e.g., through an algorithm or look-up table) that generates a turning radius of the self-propelled vehicle. A left drive wheel command and right drive wheel command are generated and transmitted to the left drive wheel pump and the right drive wheel pump. The commands control the output from the pumps (e.g., hydraulic output and direction of flow). In the drive wheel steering mode, the self-propelled vehicle may be operated by rotating the drive wheels at different speeds to steer the apparatus over an arc or in more aggressive manners in which one wheel remains stationary while the other wheel is rotated, or a zero-turn-radius mode where the drive wheels are rotated in opposite directions. In some embodiments, zero-turning may be disabled when the self-propelled baler travels above a predetermined speed.

The self-propelled vehicle 1 may also be selectively operated in a caster wheel steering or transport mode, as shown in FIG. 10. In the caster wheel steering mode of FIG. 10, the steering device 67 sets/controls the steering actuator 53. The steering system position (i.e., the position of the steering actuator 53) mechanically sets the position of the caster wheels 27. In the caster wheel steering mode, the position of the steering system (e.g., as measured by sensor 81) is not used by the control unit.

In the caster wheel steering mode, the steering system mechanically controls the orientation of the caster wheels such as by the steering system of FIG. 6. The speed and direction control device position signal is transmitted to a control unit to calculate a drive wheel command, with the left and right drive systems being controlled equally. In the transport mode of FIG. 10, the drive wheels are used to control the vehicle speed and not to steer the vehicle. The differential valve 8 of the differential system is opened to allow hydraulic flow to be transferred between the drive systems of the left and right rear wheels (e.g., upon cornering and the like) to improve maneuverability of the vehicles.

Figure 11:
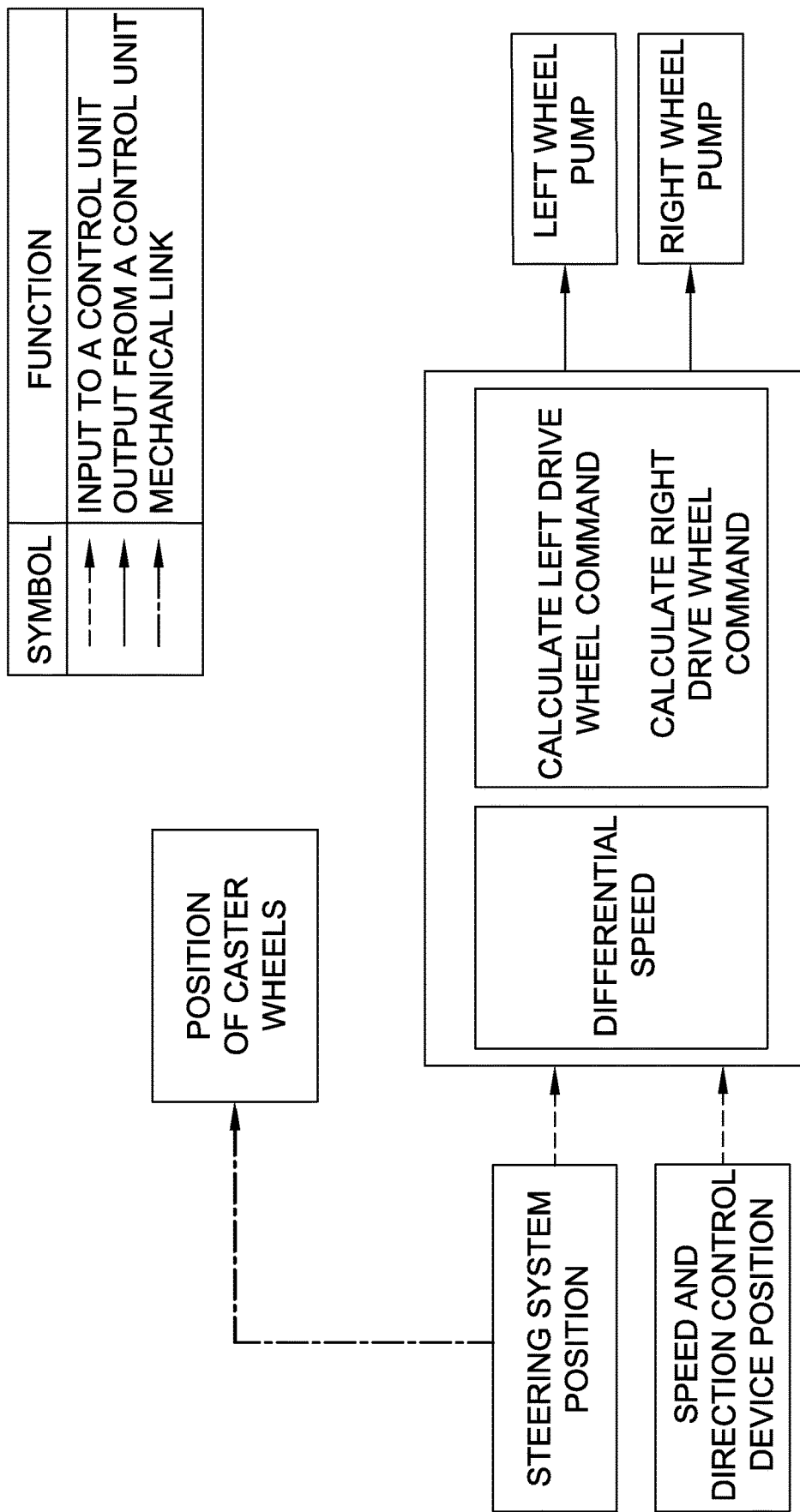
FIG. 11 is a flow diagram of a hybrid steering mode of the self-propelled vehicle.

In some embodiments and as shown in FIG. 11, the self-propelled vehicle 1 may be operated in a hybrid mode. The steering system mechanically controls the position of the caster wheels with the differential valves opened. The drive wheels are also controlled for steering based on the steering system position as measured by steering position sensor 81 (FIG. 14). The control unit determines the speed at which the drive wheels should vary in order to provide the curve that is consistent with the swivel position of the caster wheels.

In some embodiments, the self-propelled vehicle 1 is configured for autonomous operation. The vehicle may include sensors (e.g., cameras, GPS sensors and the like) that sense the position of a windrow and/or that may sense the position of the vehicle in the field. The vehicle 1 may also include a control unit that autonomously sends signals to control the vehicle speed and steering systems. In some embodiments, the field in which the vehicle is propelled is mapped and the field map is used to autonomously control the operation of the vehicle in the field. In such embodiments, the vehicle may include a riding station to carry an operator or the operator station may be eliminated.

Figure 3:
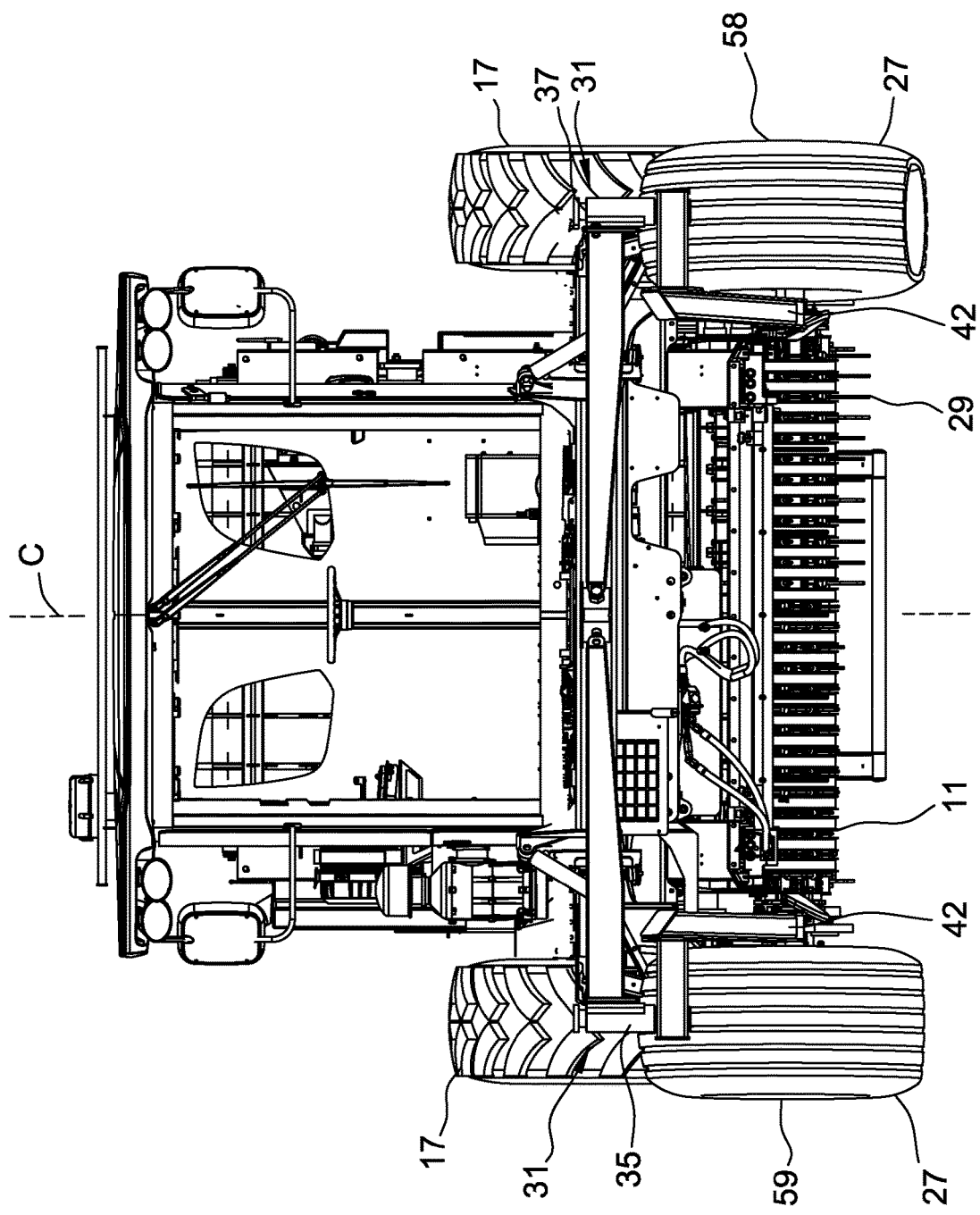
FIG. 3 is a front view of the self-propelled vehicle.
Figure 4:
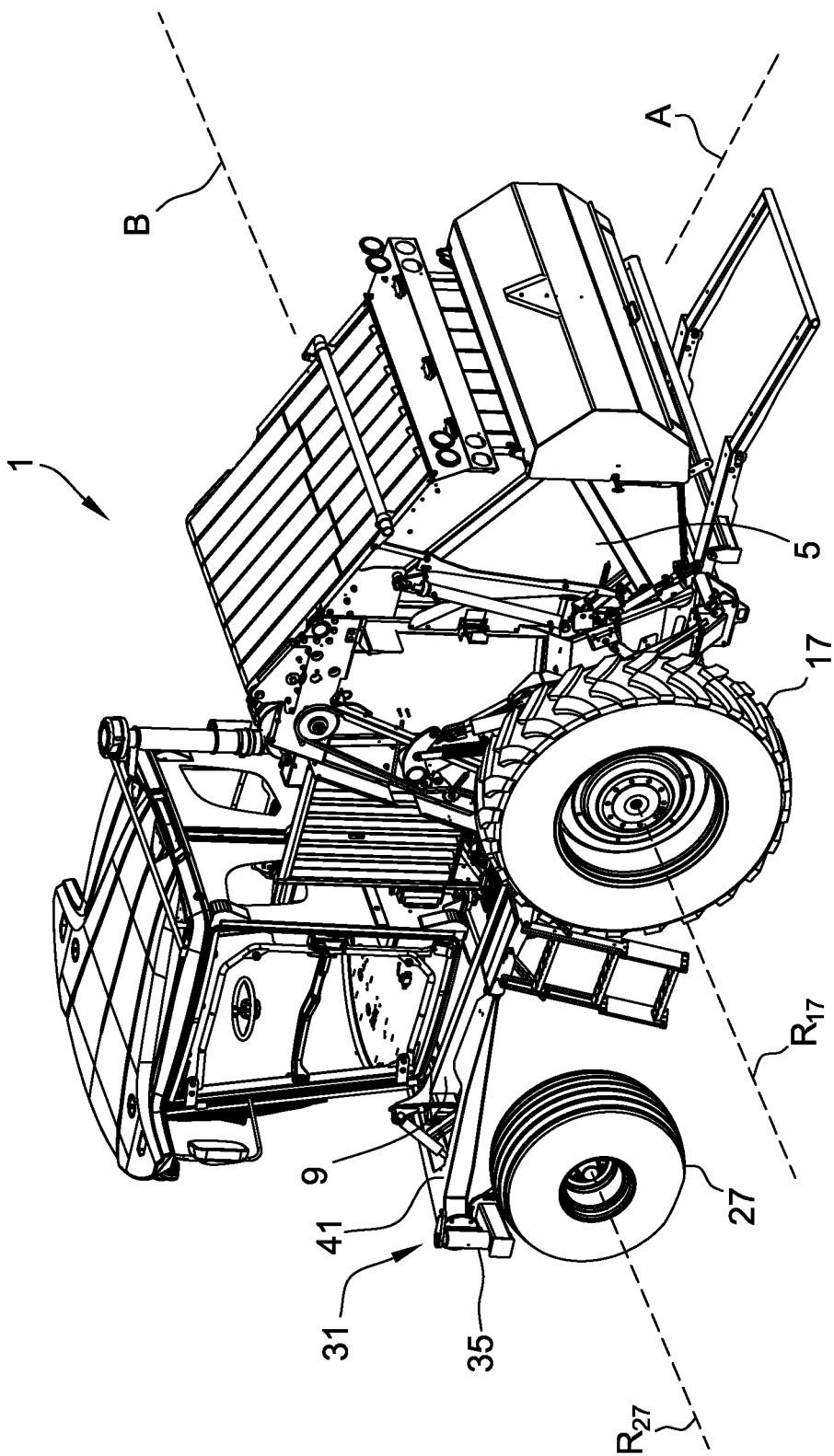
FIG. 4 is a perspective view of the self-propelled vehicle.

With reference to FIGS. 2-4, in embodiments in which the vehicle 1 is used to bale forage or crop material, the vehicle also includes a baling device 5 that includes belts, rollers, belt tighteners, and a motor that drives the rollers. In this embodiment, the baler forms bales in an expandable baling chamber, though, in other embodiments, the baler may be a fixed chamber baler. In the baling chamber, multiple belts are routed around the rollers and moved as a bale is formed, though a single bale forming belt may alternatively be used.

Tension is maintained in the bale forming belts by the one or more belt tighteners to ensure a properly compressed bale.

The baler includes a pick-up device 11 (FIG. 3) to pick up crop or forage material. The pick-up device 11 is shown in a raised position. During baling, the pick-up device 11 is in a lowered position in which the rotating teeth of the device contact the crop or forage material and direct it toward the baling chamber. As material is picked up by the pick-up device, and deposited in the baling chamber, the material is compressed by the plurality of bale forming belts. In this embodiment, the pick-up device is powered by a motor.

During operation of the baler, the baler moves across a field and along a windrow. The windrow may be formed by a mechanism, such as rakes, connected to the baler. Alternatively, the windrow may have been previously formed. The pick-up device collects material from the field and delivers the material to the baling chamber. The bale forming system forms the material into a bale within the baling chamber. Once a full bale is formed, a wrapping sequence is commenced by the wrapping mechanism 82. Once the wrapping sequence is completed, a tailgate 74 is opened and the full bale is discharged from the baling chamber and guided away from the baler by a ramp. Further details relating to the baling operation within the baling chamber can be found in U.S. Pat. No. 7,181,900, which is incorporated herein by reference.

The engine 101 (e.g., gas or diesel powered engine) drives one or more hydraulic pumps which in turn power the various hydraulic motors and cylinders (e.g., first and second drive wheel motors, baling chamber motor, pick-up device motor, pick-up device lift cylinder, lift-gate cylinder and/or ramp cylinder). The engine 101 also provides power for the electrical systems of the vehicle. The engine 101 is between the rotational axes $R_{17}$ of the rear drive wheels 17 and the rotational axes $R_{27}$ of the caster wheels 27. More specifically, the engine 101 is between the device 5 and the operator station 13.

In some embodiments, the "operator station" comprises the seat and controls for steering and controlling the speed of the vehicle. As shown in FIG. 2, the operator station 13 is enclosed in a cab 121. The operator station 13 is forward of the device 5, forward of the rotational axis $R_{17}$ of the rear drive wheels 17 and is also forward to the engine 101. The cab 121 and operator station 13 may be partially aligned with the rotational axis $R_{27}$ of the caster wheels 27 (the steering wheel may be aligned with the rotational axis $R_{27}$ while the other controls and operator seat are rearward to the rotational axis).

Figure 12:
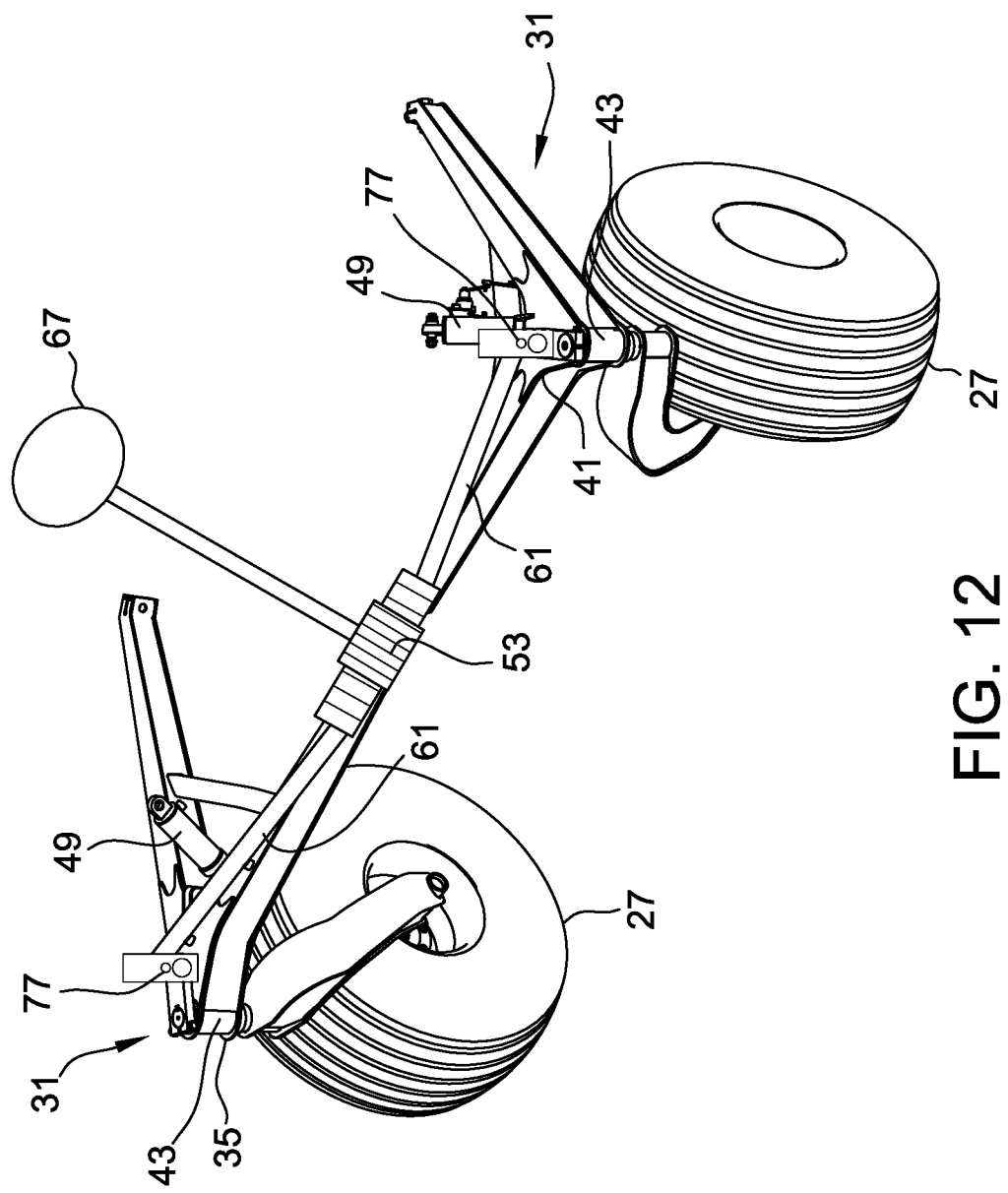
FIG. 12 is a perspective view of a steering system for a self-propelled vehicle.

FIG. 12 shows a schematic of a portion of a steering system of other embodiments of the self-propelled baling vehicle. The self-propelled baling vehicle is similar to the vehicle shown in FIG. 2 except the vehicle includes a different actuator 53 (rack and pinion) between the castor assembly 31 and the steering device 67. A tie rod 61 extends between each castor assembly 31 and the steering device 67. Each castor assembly 31 is rotatably connected to an end of a tie rod 61. In an unlocked mode, the castor assembly 31 freely pivots in relation to the tie rod 61. In a locked mode, the castor assembly 31 moves with and is pivoted by the tie rod 61. An opposite end of the tie rod 61 is connected to the steering device 67 by a geared connection (e.g., rack and pinion or gearbox). Accordingly, actuation of the steering device 67 is transferred through the tie rod 61 to the castor assembly 31. A pin 77 is positionable to selectively lock and unlock the castor assembly 31. The pin 77 may be controlled by automatic and/or manual mechanisms. In alternative embodiments, the castor assembly 31 may include any locking mechanism that enables the vehicle to operate as described.

Figure 13:
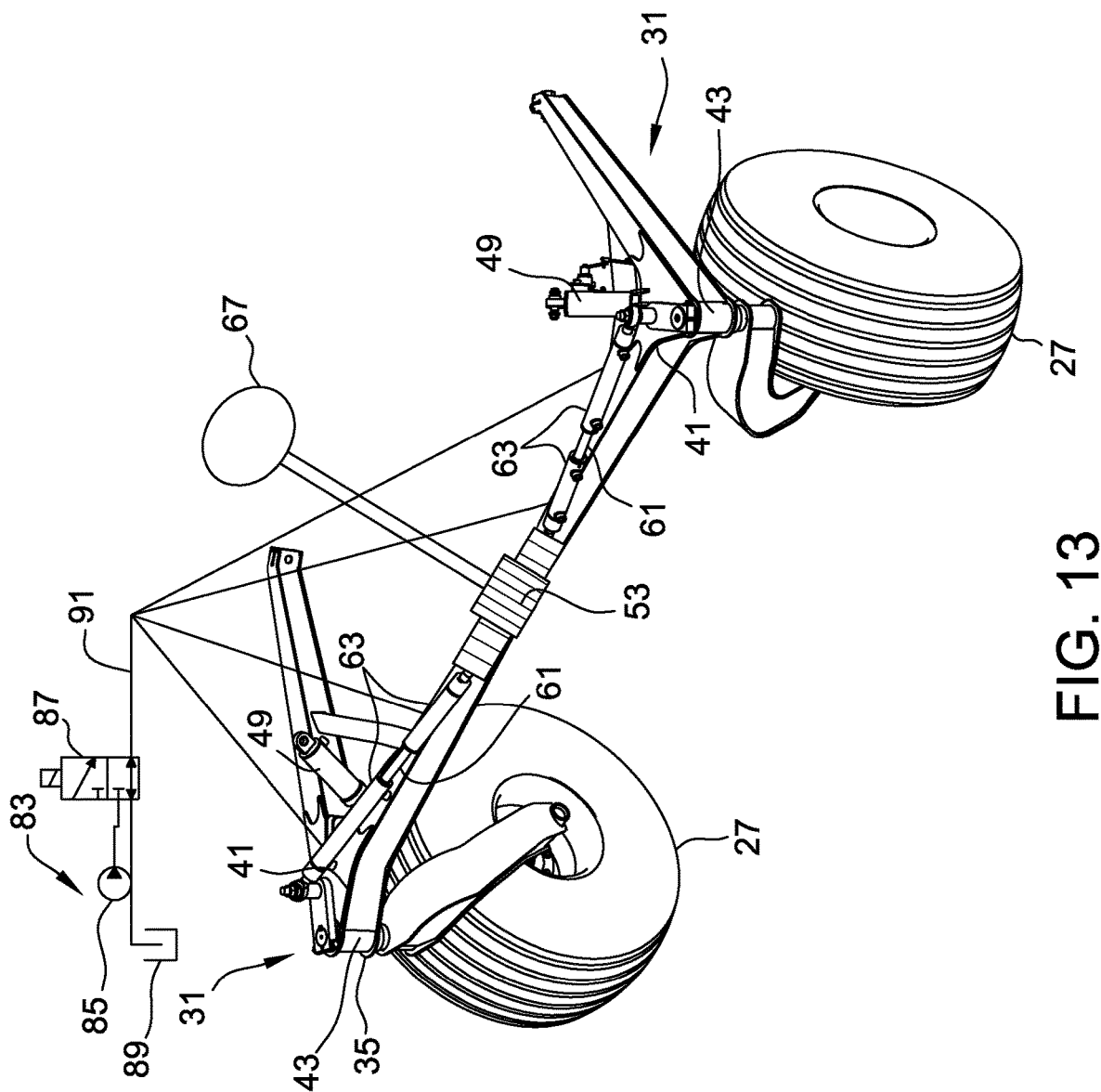
FIG. 13 is a perspective view of another steering system for a self-propelled vehicle including a hydraulic system.

FIG. 13 shows a schematic of a portion of a steering system of other embodiments of the self-propelled baling vehicle. The self-propelled baling vehicle is similar to the vehicle shown in FIG. 2 except the vehicle includes a different coupling between the castor assembly 31 and the steering device 67. In particular, disengagement cylinders 63 extend between the castor assembly 31 and the steering device 67 through a geared actuator 53 (e.g., rack and pinion or steering gear with a pitman arm). In a locked mode, the cylinders 63 are locked in an extended position to allow the steering device to control the castor assemblies 31. In an unlocked mode, the cylinders 63 float along tie rods 61 such that the castor assemblies are free to rotate.

A hydraulic system 83 is connected to the cylinders 63 and regulates the position of the cylinders. The hydraulic system 83 includes a pump 85, a valve 87, a hydraulic fluid tank 89, and fluid lines 91. Hydraulic fluid is directed into the cylinders 63 to position the cylinders in the locked position. Hydraulic fluid may freely flows from the cylinders 63 and into the tank 89 in the unlocked or float position. The valve 87 can regulate the fluid flow between the pump 85, the tank 89, and the cylinders 63. In alternative embodiments, the vehicle 1 may include any hydraulic system that enables the vehicle to operate as described.

Compared to conventional vehicles, the self-propelled vehicles of the present disclosure have several advantages. In embodiments in which a hydraulic steering system is used (e.g., with a steering device connected to a steering actuator such as a double acting hydraulic cylinder), the steering system is easily adaptable for positioning the steering wheel in positions where it is difficult to configure a mechanical drive. By separating the steering wheel from the steering actuator, noise and vibration may be reduced.

By measuring the position of the steering actuator rather than by measuring a steering wheel position, the steering measurement may be more reliable as the measurement is not affected by steering wheel creep (i.e., rotation of the steering wheel that does not cause a change in vehicle steering due to a loss of hydraulic fluid which causes an inconsistent relationship between the position of the steering device and the steering actuator). By measuring the position of the steering actuator, a signal in both drive wheel steering mode and caster wheel steering mode may be produced. By using a caster wheel steering with mechanical connections, the caster wheels may be steered mechanically rather than by drive-by-wire in the caster wheel steering mode. In embodiments in which the vehicle may operate in one of multiple modes of steering, the vehicle is versatile and has an increased operating efficiency.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A self-propelled vehicle having a longitudinal axis and comprising:
   a chassis;
   first and second drive wheels connected to the chassis;
   first and second steerable wheels connected to the chassis, each steerable wheel having a pivot axis about which the steerable wheel pivots, the first and second steerable wheels being offset from the first and second drive wheels along the longitudinal axis;
   first and second drive systems connected to the first and second drive wheels for independently controlling a rotational drive speed of each of the first and second drive wheels;
   a steering system that selectively engages the steerable wheels for steering the vehicle comprising:
      a steering device;
      a steering actuator connected to the steering device;
      a steering position sensor that produces a signal based on the position of the steering actuator; and
      a control unit that adjusts the rotational drive speed of the first drive wheel and the rotational drive speed of the second drive wheel based at least in part on the signal produced by the steering position sensor, a difference in rotational drive speed between the first and second drive wheels steering the vehicle.

2. The self-propelled vehicle as set forth in claim 1 wherein the steering actuator is selected from a hydraulic cylinder, a rack and pinion mechanism and a steering gear with pitman arm.

3. The self-propelled vehicle as set forth in claim 1 wherein the steering actuator is a hydraulic cylinder.

4. The self-propelled vehicle as set forth in claim 1 wherein the steering device is hydraulically connected to the steering actuator.

5. The self-propelled vehicle as set forth in claim 4 wherein the steering device is a steering wheel, the self-propelled vehicle further comprising an orbital valve connected to the steering device, the orbital valve being hydraulically connected to the steering actuator.

6. The self-propelled vehicle as set forth in claim 1 wherein the first steerable wheel is a first caster wheel and the second steerable wheel is a second caster wheel, the steering actuator being connected to the first and second caster wheels.

7. The self-propelled vehicle as set forth in claim 6 wherein the steering system is selectively operable between a drive wheel steering mode and a caster wheel steering mode, wherein the steering system controls a swivel position of the caster wheels to steer the vehicle in the caster wheel steering mode, the steering system controlling the speed difference between the first and second drive wheels to steer the vehicle in the drive wheel steering mode.

8. The self-propelled vehicle as set forth in claim 7 wherein, in the drive wheel steering mode, the caster wheels are free to pivot with respect to the chassis in response to differences in the first drive wheel speed and the second drive wheel speed.

9. The self-propelled vehicle as set forth in claim 7 wherein, in the caster wheel steering mode, the caster wheels are connected to the steering system and are controlled by the steering system.

10. The self-propelled vehicle as set forth in claim 7 wherein the steering system comprises a first tie rod connected to the steering actuator and the first caster wheel and a second tie rod connected to the steering actuator and the second caster wheel, each tie rod comprising a disengagement cylinder, the disengagement cylinder being in a fixed position in the caster wheel steering mode and floating in the drive wheel steering mode.

11. The self-propelled vehicle as set forth in claim 1, wherein the first drive system includes a first motor connected to the first drive wheel to rotate the first drive wheel and a first pump connected to the first motor to provide fluid to the first motor, and the second drive system includes a second motor connected to the second drive wheel to rotate the second drive wheel and a second pump connected to the second motor to provide fluid to the second motor, wherein the first pump provides a first fluid flow to the first motor and the second pump provides a second fluid flow to the second motor, the control unit adjusting the speed difference between the first and second drive wheels by varying the first and second fluid flows.

12. The self-propelled vehicle as set forth in claim 1 further comprising an agricultural device supported by the chassis, the agricultural device being selected from the group consisting of a baler, a rake, a mower, a mower conditioner, a hay merger, a sprayer, a tedder, a bale processor, a bale mover, a fruit or nut harvester, and a broadcast sprayer.

13. The self-propelled vehicle as set forth in claim 1 wherein the steering actuator is a hydraulic cylinder having a rod that extends from a barrel, the steering position sensor measuring the position of the rod.

14. The self-propelled vehicle as set forth in claim 1 wherein the steering position sensor measures the position of a tie rod that extends from the actuator.

15. The self-propelled vehicle as set forth in claim 1 wherein the steering position sensor measures the angular position of at least one of the steerable wheels.

16. The self-propelled vehicle as set forth in claim 1 wherein the first steerable wheel is a first caster wheel and the second steerable wheel is a second caster wheel, the steering device and the steering actuator being components of a caster wheel steering system, the steering system having only mechanical connections between the steering device and the caster wheels.

17. The self-propelled vehicle as set forth in claim 1 wherein the first steerable wheel is a first caster wheel and the second steerable wheel is a second caster wheel, the steering device and the steering actuator being components of a caster wheel steering system for controlling the swivel position of the caster wheels, control of the swivel position of the caster wheels not being a response to a control unit signal.

18. A steering system for steering a vehicle comprising:
    a steering device for controlling the position of the steering system;
    a hydraulic cylinder connected to the steering device;
    first and second tie rods connected to the hydraulic cylinder; and
    a steering position sensor that produces a signal based at least in part on the position of the hydraulic cylinder and/or tie rods.

19. The steering system as set forth in claim 18 wherein the hydraulic cylinder is a double acting cylinder having a through rod that extends from each side of a barrel, the through rod being connected to the first and second tie rods, the steering position sensor measuring the position of the through rod.

20. The steering system as set forth in claim 18 wherein each tie rod comprises a disengagement cylinder that is adjustable between a fixed position and a floating position.

21. A self-propelled vehicle comprising:
   a chassis;
   first and second drive wheels connected to the chassis;
   first and second non-driven steerable wheels connected to the chassis, each steerable wheel having a pivot axis about which the steerable wheel pivots, the first and second steerable wheels being offset from the first and second drive wheels along the longitudinal axis;
   first and second drive systems connected to the first and second drive wheels for independently controlling a rotational drive speed of each of the first and second drive wheels;
   a steering system for steering the vehicle comprising:
      a steering device;
      a steering actuator connected to the steering device;
      a steering position sensor that produces a signal based on the position of the steering actuator; and
      a control unit that adjusts the rotational drive speed of the first drive wheel and the rotational drive speed of the second drive wheel based at least in part on the signal produced by the steering position sensor, a difference in rotational drive speed between the first and second drive wheels steering the vehicle with each drive wheel of the vehicle being parallel to the other drive wheels while steering.

\* \* \* \* \*